United States Patent
Hiyama et al.

(10) Patent No.: US 9,744,613 B2
(45) Date of Patent: *Aug. 29, 2017

(54) FLUX RECOVERY DEVICE AND SOLDERING DEVICE

(71) Applicant: Senju Metal Industry Co., Ltd., Tokyo (JP)

(72) Inventors: Tsutomu Hiyama, Tokyo (JP); Yuta Saito, Saitama (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/033,258

(22) PCT Filed: Jun. 13, 2014

(86) PCT No.: PCT/JP2014/065797
§ 371 (c)(1),
(2) Date: Apr. 29, 2016

(87) PCT Pub. No.: WO2015/064143
PCT Pub. Date: May 7, 2015

(65) Prior Publication Data
US 2016/0279726 A1    Sep. 29, 2016

(30) Foreign Application Priority Data
Oct. 31, 2013 (JP) ................................. 2013-226663

(51) Int. Cl.
*B23K 3/00* (2006.01)
*B23K 37/00* (2006.01)
(Continued)

(52) U.S. Cl.
CPC ................ *B23K 3/08* (2013.01); *B01D 47/06* (2013.01); *B01D 47/16* (2013.01); *B01D 53/265* (2013.01);
(Continued)

(58) Field of Classification Search
CPC .. B08B 3/02; B08B 3/04; B23K 1/008; B23K 1/012; B23K 1/206
(Continued)

(56) References Cited

U.S. PATENT DOCUMENTS 4,996,781 A * 3/1991 Mishina ................. B23K 1/012
                                                    118/61
5,045,117 A * 9/1991 Witherell ................. B08B 3/08
                                                    134/108
(Continued)

FOREIGN PATENT DOCUMENTS

GB    2101497 A    1/1983
JP    48-84070    10/1973
(Continued)

*Primary Examiner* — Erin Saad
(74) *Attorney, Agent, or Firm* — The Webb Law Firm

(57) ABSTRACT

A flux recovery device that recovers a flux component from a gaseous mixture. The flux recovery device includes a first water spray unit that sprays water into a gaseous mixture containing the flux component, a separation unit that includes an introduction port for introducing the gaseous mixture into which water is sprayed from the first water spray unit, and a second water spray unit that forms a precipitation flow inside of the separation unit. The separation unit uses a swirling flow to separate the flux component from the gaseous mixture. A condensation unit cools water vapor generated in the separation unit to change the water vapor to water droplets, thereby removing the water vapor. Water vapor generated in a separation unit is cooled by a condensation unit, recovered as water droplets, and reused.

17 Claims, 11 Drawing Sheets

(51) Int. Cl.
- *B23K 3/08* (2006.01)
- *B23K 1/00* (2006.01)
- *B23K 1/008* (2006.01)
- *B23K 1/20* (2006.01)
- *B23K 3/06* (2006.01)
- *B23K 35/362* (2006.01)
- *B01D 47/06* (2006.01)
- *B01D 47/16* (2006.01)
- *B01D 53/26* (2006.01)
- *B23K 101/42* (2006.01)

(52) U.S. Cl.
CPC ............ *B23K 1/008* (2013.01); *B23K 1/0016* (2013.01); *B23K 1/203* (2013.01); *B23K 3/0638* (2013.01); *B23K 3/0653* (2013.01); *B23K 35/362* (2013.01); *B23K 2201/42* (2013.01)

(58) Field of Classification Search
USPC .... 228/201, 205, 219, 42; 96/306, 311, 313, 96/314, 319, 321; 55/447–461
See application file for complete search history.

(56) References Cited

U.S. PATENT DOCUMENTS

| | | |
|---|---|---|
| 5,512,072 A | 4/1996 | Laslo |
| 6,382,500 B1 | 5/2002 | Master et al. |
| 6,550,751 B1 | 4/2003 | Brown et al. |

FOREIGN PATENT DOCUMENTS

| | | |
|---|---|---|
| JP | 62-149318 | 7/1987 |
| JP | 2-95523 U | 7/1990 |
| JP | 03-181391 | 8/1990 |
| JP | 3-76993 B2 | 12/1991 |
| JP | 3-76994 B2 | 12/1991 |
| JP | 04-267917 | 9/1992 |
| JP | 5-58755 B2 | 8/1993 |
| JP | 05-302736 | 11/1993 |
| JP | 2004-267928 | 9/2004 |
| JP | 2007-000781 | 1/2007 |
| JP | 2007-053158 | 3/2007 |
| JP | 2007109841 A | 4/2007 |
| JP | 2008-168201 | 7/2008 |
| JP | 2012-033577 | 2/2012 |
| WO | 2012/112040 A1 | 8/2012 |

* cited by examiner

FLUX RECOVERY DEVICE AND SOLDERING DEVICE

CROSS-REFERENCE TO RELATED APPLICATIONS

This application is the United States national phase of International Application No. PCT/JP2014/065797 filed Jun. 13, 2014, and claims priority to Japanese Patent Application No. 2013-226663 filed Oct. 31, 2013, the disclosures of which are hereby incorporated in their entirety by reference.

TECHNICAL FIELD

The present invention relates to a flux recovery device that separate a gas containing no flux component from a gaseous mixture containing the flux component to recover the flux component, and a soldering device.

BACKGROUND ART

When soldering an electronic component to a predetermined face of a circuit board, a reflow furnace, a jet soldering device and the like have been used in the past. For example, in a case of soldering it in the reflow furnace, a solder paste has been used. The solder paste is produced by mixing flux and solder powder into paste. The solder paste is applied to a soldered portion of a circuit board by printing or by using a dispenser. An electronic component is mounted thereon, and then, the solder paste is heated and melted in the reflow furnace to electrically connect the circuit board and the electronic component. Generally, soldering is performed in an atmosphere filled with inert gas or in the atmosphere (air).

The flux removes an oxide film on the surface of metal to be soldered, and prevents reoxidation of the metal surface during heating in the soldering step. The flux reduces surface tension of the solder powders to improve wettability thereof. The flux has a solid component, such as pine resin, a thixotropic agent, and an activator, which is dissolved with a solvent.

In a preheating zone, especially the solvent in the flux component of the solder paste applied to the circuit board volatilizes (vaporizes) to become flux fumes, and in a main heating zone, when subjected to high temperatures, a solid component such as rosin in the flux component melted in the preheating zone also vaporizes to become fumes and floats in the furnace. When the solvent or solid component-derived fumes contact relatively cool sites in the furnace, for example, a conveyor for transferring the circuit board into the furnace, a frame constituting the furnace (for example, a nozzle plate, a cooling plate, and a labyrinth and the like), and a labyrinth installed at a gate of the furnace, the fumes are cooled to be condensed. Then, when exposed to cooler temperature, the condensed fumes become cohesive solid matter. A lot of solidified fumes, that is, so-called solid fumes adhere to each part constituting the reflow furnace, causing any problems.

For example, when a lot of solid fumes adhere to the conveyor, the circuit board sticks to the conveyor. Thus, at delivery, the circuit board is not separated from the conveyor, and is caught in a sprocket of the conveyor and damaged. When a lot of solid fumes adhere to the frame, accumulated solid fumes fall off on the circuit board being transferred, soiling the circuit board.

Thus, in consideration of the problems related to adhesion of these solid fumes, many methods and devices that remove the flux component from the furnace has been proposed in the past. That is, there have been proposed various kinds of soldering devices including a flux recovery device that separates a flux component from a gaseous mixture of the flux component generated in the soldering process and gas derived from the atmosphere in a soldering unit (inert atmosphere, ambient atmosphere), and circulates clean gas in the soldering unit.

Patent Document 1 discloses a flux recovery device that is applicable to a reflow furnace. This flux recovery device includes a centrifuge separator having a cyclone mechanism, which is a dual cylinder consisting of a substantially cylindrical cyclone outer peripheral portion and a substantially cylindrical cyclone inner peripheral portion stored in the cyclone outer peripheral portion. A cooling plate is provided on the outer wall face of the cyclone outer peripheral portion to cool gaseous mixture containing a flux component, which is introduced into the centrifugal separator.

The gaseous mixture flows into the centrifugal separator and forms a spiral downward air flow between the inner wall of the cyclone outer peripheral portion and the outer wall of the cyclone inner peripheral portion, while being cooled with the cooling plate. The flux component, which is cooled and liquidized during this time, is centrifuged and adheres to the inner wall of the cyclone outer peripheral portion. The flux component adhered to the inner wall of the cyclone outer peripheral portion falls along the inner wall of the cyclone outer peripheral portion due to self-weight, and is recovered in a flux storage unit. Thereby, clean air can be delivered to the reflow furnace.

In connection of the flux recovery device, Patent Documents 2 to 5 disclose interior cleaners applicable to a clean room. Each of the interior cleaners includes a water spray device and a detearing cyclone, and the water spray device is connected to a clean room and provides ultrafine water droplets to air discharged from the clean room. The air discharged from the clean room contains dusts. The ultrafine water droplets fill the water spray device. The detearing cyclone is connected to the water spray device, and the air containing water droplets is divided into air and dusts or the like by means of a cyclone flow. This enables clean air to be supplied to the clean room.

PRIOR ART DOCUMENTS

Patent Documents

Patent Document 1: Japanese Unexamined Patent Application Publication No. 2012-033577
Patent Document 2: Japanese Unexamined Patent Application Publication No. S62-149318
Patent Document 3: Japanese Examined Patent Publication No. H03-076993
Patent Document 4: Japanese Examined Patent Publication No. H03-076994
Patent Document 5: Japanese Examined Patent Publication No. H05-058755

PROBLEMS WITH THE PRIOR ART

By the way, according to the prior art flux recovery device and soldering device, there are following problems.

i. In the reflow furnace disclosed in Patent Document 1, the cyclone mechanism of the flux recovery device is provided with the cooling plate, and a gaseous mixture forms a spiral downward air flow between the inner wall of the cyclone outer peripheral portion and the outer wall of the cyclone inner peripheral portion, while being cooled with the cooling plate. A method is adopted in which the flux component, which is cooled and liquidized during this time, is centrifuged and adheres to the inner wall of the cyclone outer peripheral portion.

For this reason, the gaseous mixture is not centrifuged so much while the gaseous mixture is not sufficiently cooled, and it spirally circulates between the inner wall of the cyclone outer peripheral portion and the outer wall of the cyclone inner peripheral portion. As compared to the method of separating air to which water droplets are given into air and dusts and the like by using the cyclone flow as disclosed in Patent Document 2, even when provided with the cooling plate, this configuration has a lower separation efficiency of the cyclone flow.

ii. When the configuration in which the water spray device is separated from the detearing cyclone and is connected to the detearing cyclone via a pipe as disclosed in Patent Documents 2 through 5 is applied to the flux recovery device, while a gaseous mixture to which ultrafine water droplets (flux fumes gas) are given travels from the water spray device to the detearing cyclone, the flux component thereof is cooled, and liquidized and solidified. Therefore, disadvantageously, the liquidized and solidified flux component can clog an introduction pipe or an introduction port of the detearing cyclone, or can become choked, preventing the gaseous mixture from flowing into the detearing cyclone (cyclone generation unit).

Further, when water vapor generated during separation flows into the soldering unit, the water vapor is condensed at a low temperature site in the soldering unit to become a water droplet. The water droplet adheres to the furnace, causing any rust. Adhesion of the water droplet to the circuit board causes the circuit board to absorb moisture. In the moist circuit board, the absorbed moisture water evaporates by heating at soldering. With the evaporation of moisture, a phenomenon such that solder of the soldering site scatters may occur. The solder scattering causes electrical short-circuit between terminals, that is, so-called "solder bridge" contributing to a solder failure. Furthermore, the moist circuit board may cause degradation of the soldering site and migration due to aging. Thus, the water vapor entering the furnace may lead to a failure related to reliability of the circuit board. Moreover, the amount of reusable water decreases.

SUMMARY OF THE INVENTION

This invention solves the above problems and has an object to provide a flux recovery device and a soldering device, which can efficiently separate a gaseous mixture containing the flux component into a flux component and gas by devising a configuration of a separation unit, which condenses water vapor generated in the separation unit and recovers the water vapor to prevent water vapor from entering into the soldering unit, and which makes the recovered water vapor reusable.

To solve the above-mentioned problems, a flux recovery device according to the present invention recovers a flux component from a gaseous mixture containing the flux component. The flux recovery device includes a first water spray unit that sprays water into the gaseous mixture, a separation unit that includes an introduction port for introducing the gaseous mixture into which water is sprayed from the first water spray unit, the separation unit using a swirling flow to separate the flux component from the gaseous mixture, a second water spray unit that forms a precipitation flow inside of the separation unit, and a condensation unit that removes water vapor generated in the separation unit.

The separation unit contains a cylindrical body for separation of the flux component, the cylindrical body including the introduction portion in an upper side portion thereof, an opening in an upper portion thereof, and a conical portion in a lower portion thereof, and a cover engaged with the opening of the cylindrical body, wherein the cover includes a disc-shaped body portion, an exhaust cylindrical portion having a predetermined length passes through the body portion, the conical portion includes a drain port, when the gaseous mixture is taken into the introduction portion from a tangent direction of the cylindrical body, the flux component and water confluent with the precipitation flow formed on an inner side of the cylindrical body by the second water spray unit by means of the swirling flow formed by the first water spray unit are discharged from the drain port, and the cylindrical portion takes gas separated from the gaseous mixture at one end and exhausts the gas from the other end.

The first water spray unit has a nozzle configured to spray the water in a fan or conical fashion, and the second water spray unit includes an annular pipe having a plurality of blow-off ports, the annular pipe being configured to radially spray the water.

The flux recovery device of the present invention includes a water cleaner configured to clean water recovered by the separation unit.

The water cleaner may include an ozonation unit and an activated carbon filter.

The flux recovery device of the present invention includes a water supply unit that supplies water to the first water spray unit and the second water spray unit, and a cooling unit that cools water of the water supply unit.

The condensation unit is connected to the water cleaner, and water recovered by the condensation unit is supplied to the water cleaner.

A soldering device of the present invention includes a soldering unit and the flux recovery device. The flux recovery device is configured to recover the flux component from the gaseous mixture containing the flux component generated in the soldering unit.

In the flux recovery device according to the present invention, the gaseous mixture containing the flux component, which is introduced into the separation unit, becomes moist due to the swirling flow (whirlpool) formed by the first water spray unit, and circulates in the separation unit. Due to the swirling flow, the moist gaseous mixture separates into water containing the flux component and gas. The water containing the flux component that is heavier than the gas is discharged from the drain port to the outside. Water vapor generated in the separation unit is cooled by the condensation unit, and becomes a water droplet to be recovered.

Thus, the flux component can be efficiently recovered from the gaseous mixture containing the flux component. Further, since it is possible to prevent water vapor from entering into the soldering unit, it is possible to prevent rust from occurring in the furnace and prevent any failure generated with the moist circuit board from occurring. Further, water reuse rate can be enhanced. Further, since the swirling flow and the precipitation flow in the separation unit prevent the flux component from adhering to the inner wall of the separation unit, no maintenance of the inner wall of the separation unit is required.

By the soldering device provided with the flux recovery device of the present invention, it is possible to provide a reflow furnace, a jet soldering device or the like that can recover the flux component and can provide can reuse water efficiently.

DESCRIPTION OF THE INVENTION

A flux recovery device and a soldering device in accordance with an embodiment of the present invention will be described below with reference to drawings. A flux recovery device 100 of the present invention is a device for recovering a flux component from a gaseous mixture containing the flux component generated in soldering. Here, the gaseous mixture containing the flux component is referred to as a gas to which a gaseous flux component generated in soldering and gas derived from the atmosphere (inert atmosphere and ambient atmosphere) in a soldering unit are mixed.

Figure 1:
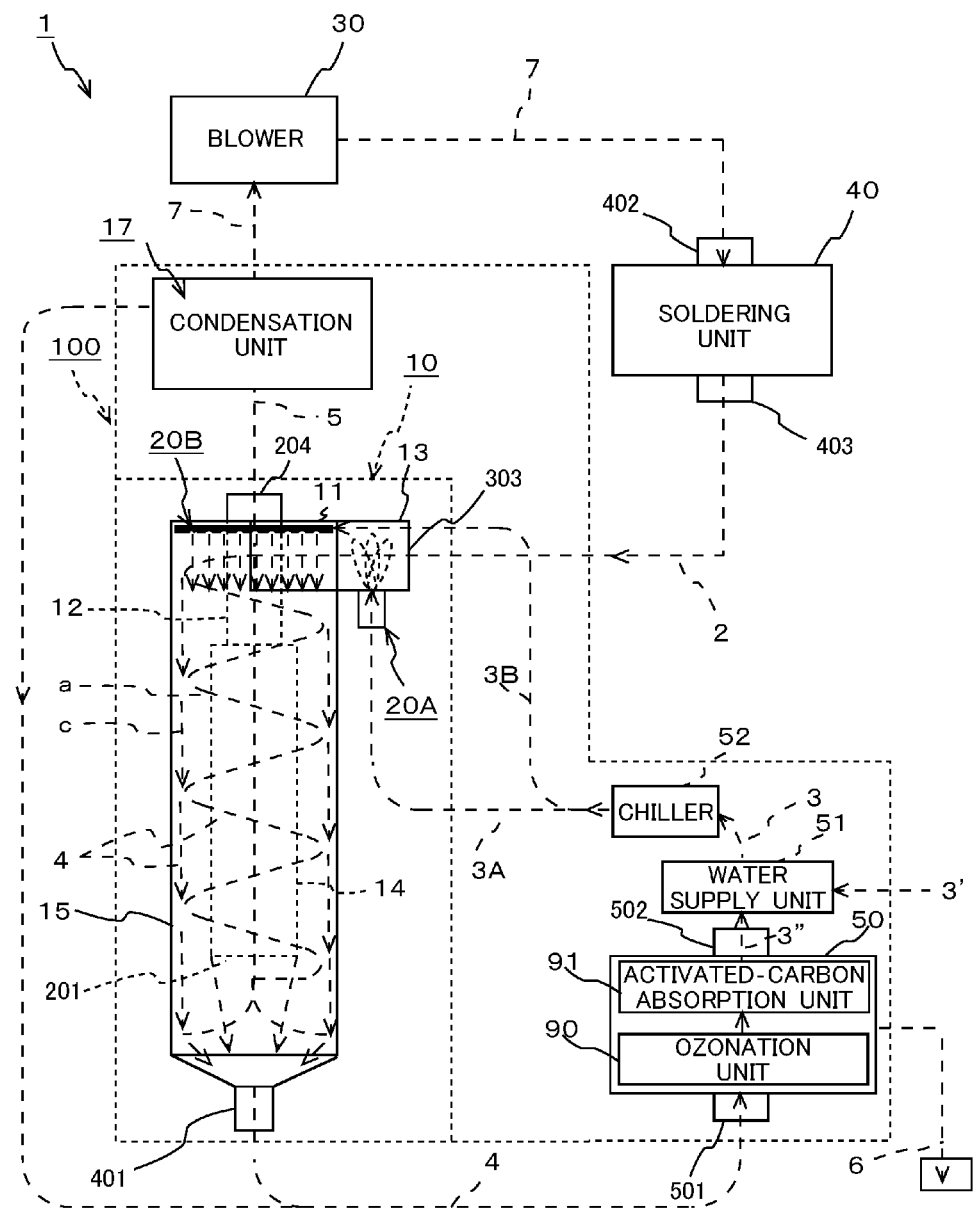
FIG. 1 is a block diagram illustrating a configuration example of a soldering device 1.

Referring to FIG. 1, a configuration example of a soldering device 1 to which the present invention can apply will be described below. In this example, the soldering device 1 has a soldering unit 40 operating in the ambient atmosphere, and the flux recovery device 100 that recovers a flux component from a gaseous mixture generated in the soldering unit 40, and returns only processed atmosphere (air) to the soldering unit 40. This can also apply to the case where the soldering unit is in the inert atmosphere.

In practice, a gaseous mixture 2 is recovered from an exhaust port 403 of the soldering unit 40, and the processed atmosphere (air) after the flux has been removed is returned to a suction port 402 of the soldering unit 40 via a blower 30 to be reused.

The flux recovery device 100 according to the present invention includes a cylindrical separator 15 that recovers and separates the flux component from the gaseous mixture 2. The separator 15 includes an outer pipe and an inner pipe (cylindrical unit) 14 that is shorter than the outer pipe. The separator 15 is opened at a top end, and the gaseous mixture is supplied through the top end.

The flux component is separated and recovered using water in addition to the gaseous mixture, by circulating and dropping the water and the gaseous mixture in the separator 15. Therefore, the top end of the separator 15 is covered with a cover 11 and an introduction portion (introduction port) 13 for water and the gaseous mixture is provided utilizing a part of the outer peripheral face of the top end of the separator 15.

Water 3 supplied from the outside is divided into first and second water spray lines and then, is supplied. A configuration is adopted in which the water is first sprayed while falling from the top end along the inner peripheral face of the separator through an introduction port 303 in the top end (the water 3 supplied to the water spray lines is hereinafter referred to as "conducted water 3B"). In addition, a first water spray unit 20A provided at an inlet of the separator 15 sprays the water 3 to the gaseous mixture 2, and the gaseous mixture in this state is conducted into the separator 15. The water 3 used in this water spray line is hereinafter referred to as "conducted water 3A".

The conducted water 3A is set to have a speed of fluid so as to hit against the inner wall of the separator 15, resulting in that the conducted water 3A and a part of the conducted water 3B sprayed from the top end fall while spirally rotating (swirling flow "a" represented by dotted lines). Since the part of the conducted water 3B falls along the inner wall of the separator 15 (precipitation flow "c" represented by dotted lines), the flux component contained in the gaseous mixture is guided to the bottom of the outer pipe without touching the inner wall face, preventing the flux component from adhering to and soiling the inner wall face of the separator 15.

Following configurations are further applied to the separator 15. A coupling cylindrical body 12 is provided from the center of the cover 11 toward the inside of the separator 15, and the coupling cylindrical body (cylindrical portion) 12 is coupled to the upper end of the inner pipe 14. The coupling cylindrical body 12 may be omitted to expose the inner pipe 14 from the cover 11 to the outside.

The gaseous mixture falls to the bottom of the outer pipe in the separator 15. In the process, the flux component in the gaseous mixture is cooled with the water 3 supplied into the separator 15, and as most of the flux component starts being liquidized and solidified, and the flux component is covered with sprayed water. Gas component (air mainly containing water vapor) in the gaseous mixture is sucked into the opening of the inner pipe 14, and the sucked gas component rises in the inner pipe 14 and reaches an gas exhaust 204 of the gas.

The gas component guided to the gas exhaust 204 is guided to the condensation unit 17. Since the condensation unit 17 cools the gas component, the water vapor component in the gas component is condensed. Providing the condensation unit 17 allows gas passing through the condensation unit 17 to be only dry air containing no water vapor. Then, the air is supplied to the soldering unit 40 via the blower 30 (first circulation path). Accordingly, dry air can be sent to the soldering unit 40. Water droplet generated through condensation is supplied to the water cleaner 50 to be described later.

On the other hand, the flux component covered with moisture and water are discharged from a drain port 401 provided on the bottom of the separator 15. The drain port 401 is coupled to an inlet 501 of the water cleaner 50. The water cleaner 50, which will be described later in detail, separates water from the flux component, and recovers flux 6. The cleaned water 3 is discharged from a drain port 502, and the drained water is reused as treated water in the separator 15 (second circulation path). Water may be newly added as necessary.

Figure 2:
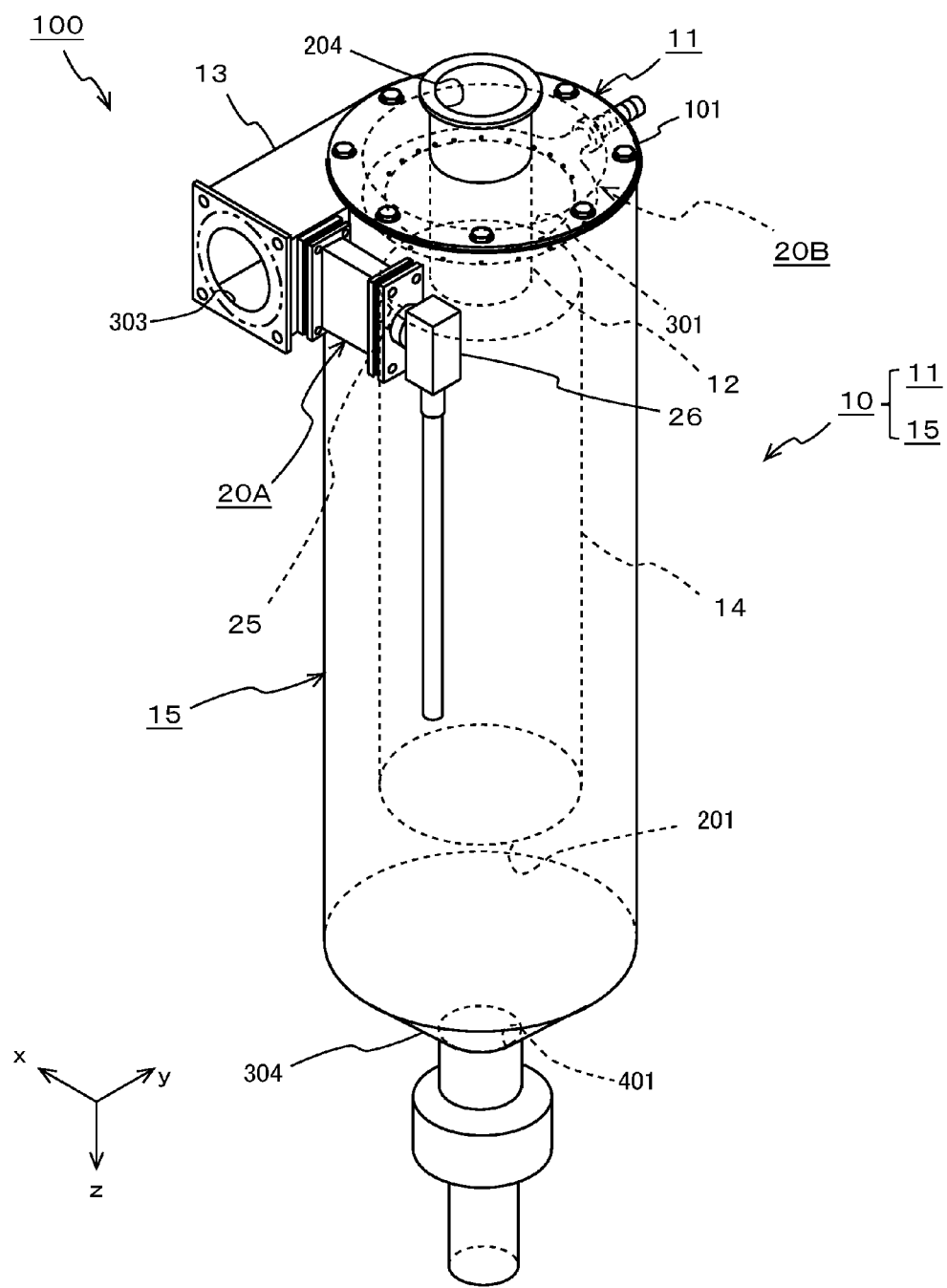
FIG. 2 is a perspective view of a flux recovery device 100 in accordance with an embodiment of the present invention for illustrating a configuration example thereof.
Figure 3:
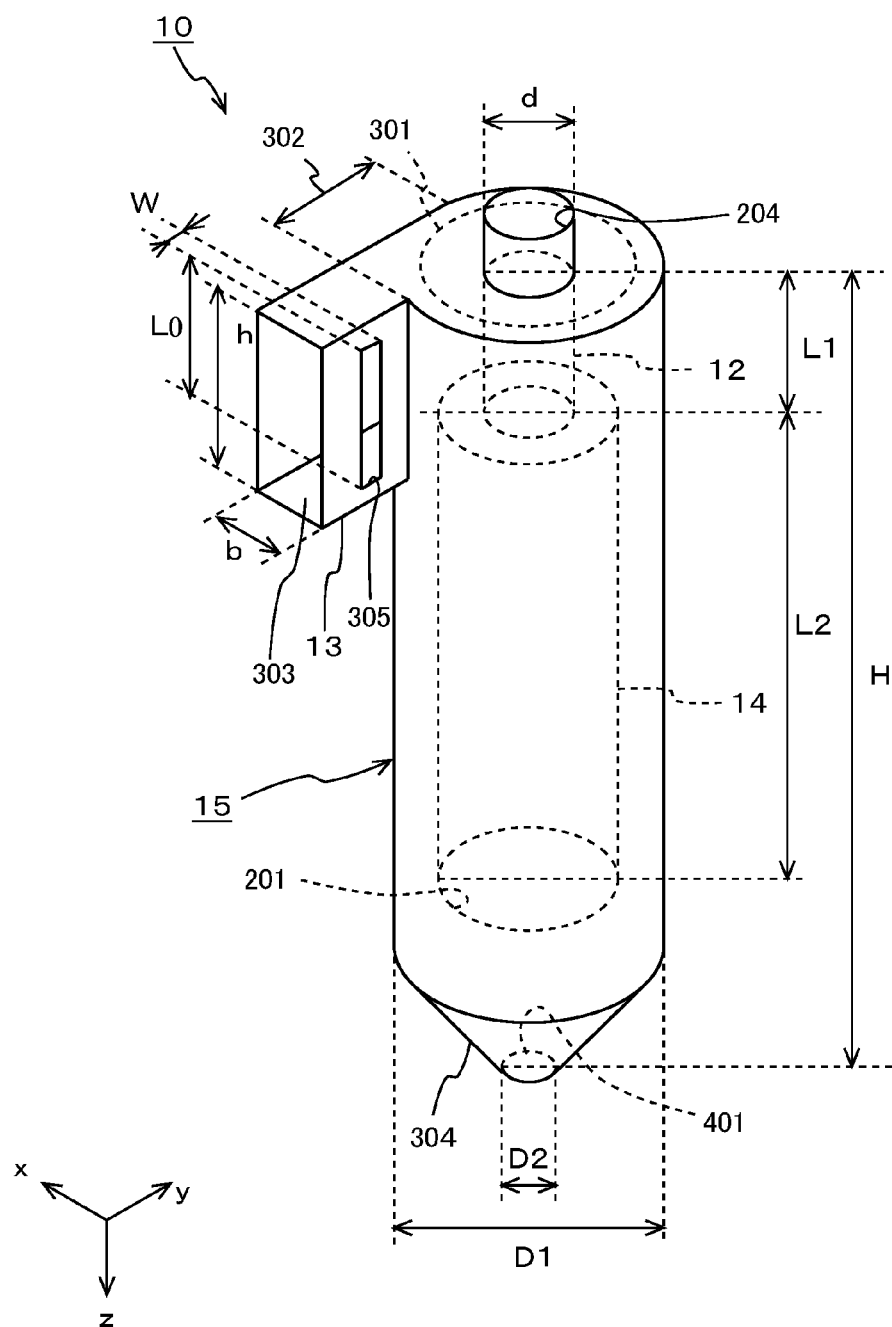
FIG. 3 is a perspective view of a separation unit 10 for illustrating exemplary size thereof.

Subsequently, referring to FIGS. 2 and 3, the above-mentioned flux recovery device 100 will be described below in detail. A separation unit 10 includes a cover 11 and a cylindrical body for flux separation (hereinafter, referred to as "separator 15"). The separator 15 has a flange-like opening 301 at the top thereof, the introduction portion 13 at the upper side portion thereof, and a conical portion 304 at the lower portion thereof. The upper side portion of the separator 15 is cut (opened) into a rectangular window, to form a joint portion 302. The separator 15 is made of, for example, a stainless steel plate having a predetermined thickness.

The introduction portion 13 tangentially extends from the circular site of the separator 15. The introduction portion 13 has a rectangular cross section and is shaped like a duct, and its one end communicates with the separator 15 at the joint portion 302. The introduction portion 13 has a rectangular or circular introduction port 303 at the other end. The introduction portion 13 has a slit 305 (opening) at the inside of the separation unit 10. The inside described herein refers to the inner side of the connected site between the introduction portion 13 and the separator 15 in the joint portion 302. Hereinafter, this is referred to as "the inside".

Like the separator 15, the introduction portion 13 is made of the stainless steel plate. The introduction port 303 is coupled to, for example, an exhaust port of the soldering unit 1. The gaseous mixture containing the flux component generated in soldering is discharged to the exhaust port.

In this embodiment, the first water spray unit 20A is provided immediately in front of the separation unit 10. The first water spray unit 20A is provided, for example, on the inner side of a tangent direction x of the introduction portion 13, and at the inside of the introduction portion 13. The first water spray unit 20A has a nozzle 25, and sprays water in a fan (or conical) shape using the nozzle 25 (first precipitation flow). For instance, the nozzle 25 forms a water film over the introduction port 303, and causes the gaseous mixture to pass through the water film. Since the gaseous mixture is cooled with the water sprayed from the nozzle 25, the flux component in the gaseous mixture starts being liquidized and solidified, and is covered with the sprayed water.

When the first water spray unit 20A sprays water in fog (mist), the water efficiently sticks to (coat) the flux component in the gaseous mixture. Further, since the first water spray unit 20A is provided on the inner side of the tangent direction x of the introduction portion 13, and at the inside of the introduction portion 13, the sprayed water is sucked into the separator 15 using the blower 30 and becomes a swirling flow that falls while swirling along the inner periphery (inner wall) of the separator 15.

The cover 11 is attached to the top of the separator 15. The cover 11 includes a disc-shaped body portion 101, and is screwed so as to close the flange-like opening 301 of the separator 15. For example, the cover 11 is formed by cutting a thick stainless steel plate into a collar. The cover 11 includes an exhaust cylindrical portion 12 that extends along the center (axis) of the swirling flow and passes through the body portion 101. The cylindrical portion 12 has a predetermined length. A cylindrical portion 14 that is coaxial with the cylindrical portion 12 and has a larger diameter than the cylindrical portion 12 is bonded to the underside of the cylindrical portion 12. The cylindrical portion 14 also has a predetermined length.

The second water spray unit 20B is provided on the back side of the cover 11, and at the inner upper portion of the separator 15 (around the cylindrical portion 12). The second water spray unit 20B includes an annular pipe, and the annular pipe has a plurality of blow-off ports on its surface. The second water spray unit 20B radially sprays water to the inner periphery (inner wall) of the separator 15 and the outer peripheries (outer walls) of the cylindrical portions 12 and 14 (second precipitation flow). Thereby, the precipitation flow is formed on the inner wall of the separator 15 and the outer walls of the cylindrical portions 12 and 14 and can prevent the moist flux component from adhering to the inner wall of the separator 15 and the outer walls of the cylindrical portions 12 and 14. Therefore, cleaning of the inner wall of the separator 15 and the outer walls of the cylindrical portions 12 and 14 is unnecessary, resulting in elimination of the need for maintenance.

The cylindrical portion 12 is provided with a gas exhaust 204 at one end thereof and is connected to the cylindrical portion 14 at the other end thereof. The other end of the cylindrical portion 14 is provided with a suction port 201. The gas exhaust 204 is connected to the condensation unit 17. The other end of the condensation unit 17 is connected to a blower or the like. Thus, the gas 5 obtained by separating the flux component from the gaseous mixture containing the flux component generated in soldering is taken from the suction port 201, and is sent from the gas exhaust 204 to the blower 30 via the condensation unit 17. The gas 5 contains water vapor, but the condensation unit 17 cools the water vapor contained in the gas 5, condenses the water vapor into a water droplet, and removes the water droplet. Gas 7 with water droplet removed is sent to the blower 30. The water droplet is sent to the water cleaner 50. The blower 30 is configured to blow the clean gas 7 after the flux and water vapor have been recovered to the soldering unit 40.

On the other hand, the drain port 401 is provided in the above conical portion 304 and is configured to discharge water containing the flux component after separation of the clean air. The water has been sprayed from each of the water spray units. When taken into the introduction port 303 along the tangent direction of the separator 15, the gaseous mixture containing the flux component generated in soldering is subjected to the first precipitation flow by the first water spray unit 20A, and puts on moisture. The gaseous mixture is subjected to the second precipitation flow on the inner side of the separator 15 by the second water spray unit 20B (See FIGS. 7 and 8).

In the drawing, x also indicates a water spray direction of the first water spray unit 20A, y indicates an introduction direction of the gaseous mixture into the introduction port 303, and z indicates a falling direction of a swirling (spiral) flow of water containing the flux component in the separator 15.

Subsequently, referring to FIG. 3, exemplary size of the separation unit 10 will be described. In the drawing, L1 indicates a length of the cylindrical portion 12 in the cover 11, and L2 is a length of the cylindrical portion 14. The cylindrical portion 12 is shorter than the cylindrical portion 14, and is embedded inside of the cover 11.

In this embodiment, the suction port 201 is provided at the position with the length L1+L2 with respect to the cover 11. The length of L1+L2 is ensured to prevent water containing the flux component from returning to the suction port 201. H indicates a height of the separator 15. D1 indicates an outer diameter of the cover 11 and the separator 15, and D2 indicates a diameter of the drain port 401 of the conical portion 304.

Further, "b" indicates an opening width of the introduction port 303, and "h" indicates a height of the introduction port 303. "d" indicates a diameter of the gas exhaust 204. The slit 305 is formed in the side face of the introduction portion 13. The slit 305 has a predetermined length L0 and a predetermined width W. The first water spray unit 20A illustrated in FIG. 2 is attached to the slit 305.

When a water film is formed over the introduction port 303 from the first water spray unit 20A, it is estimated that an increase in pressure loss can occur. In this embodiment, the slit 305 is set to have a length L0 of about 70 to 80 mm, and a width W of about 5 to 10 mm. These constitute the separation unit 10.

Figure 4:
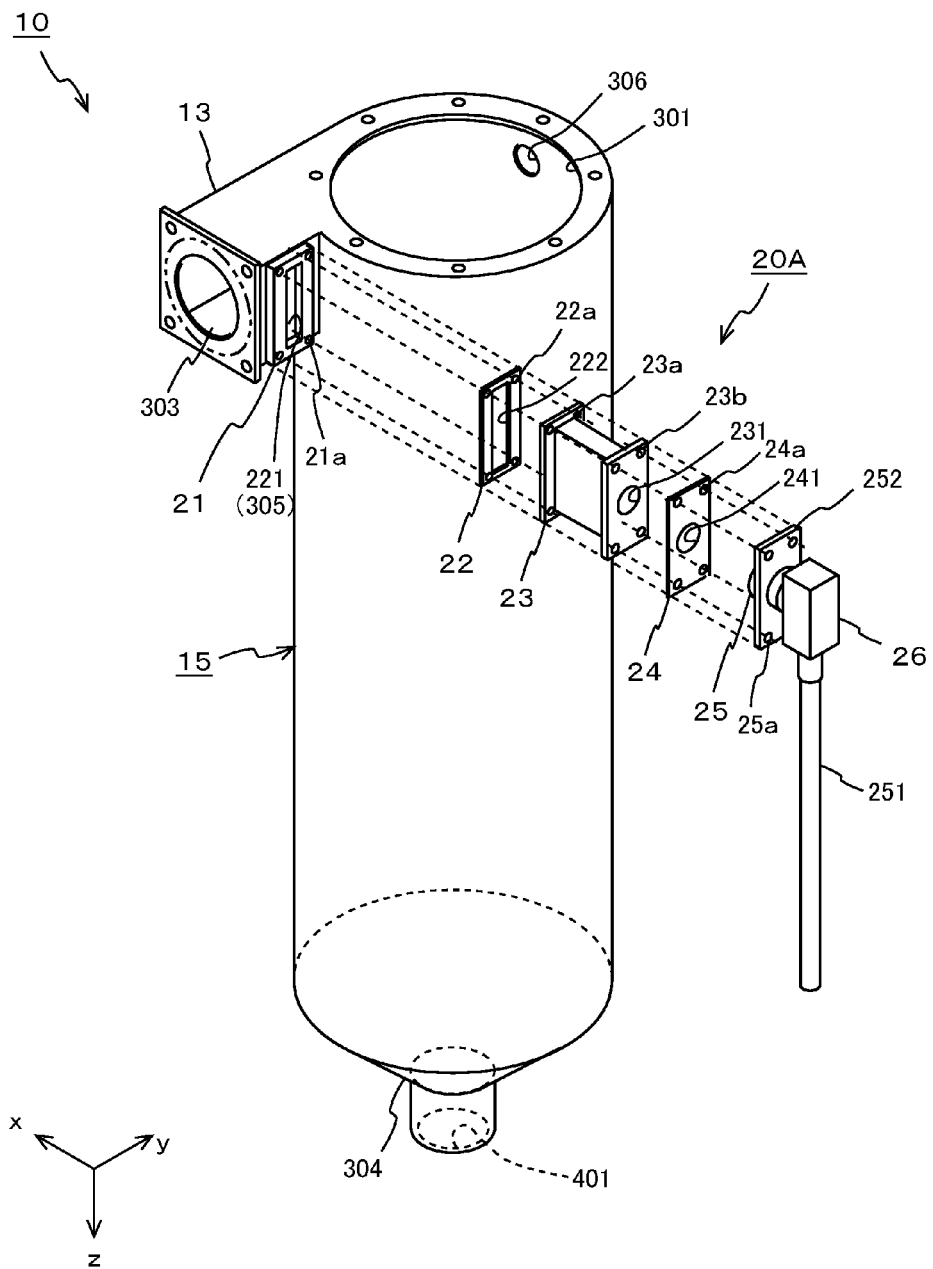
FIG. 4 is an exploded perspective view of the separation unit 10 for illustrating an assembly example thereof (Part 1).
Figure 5:
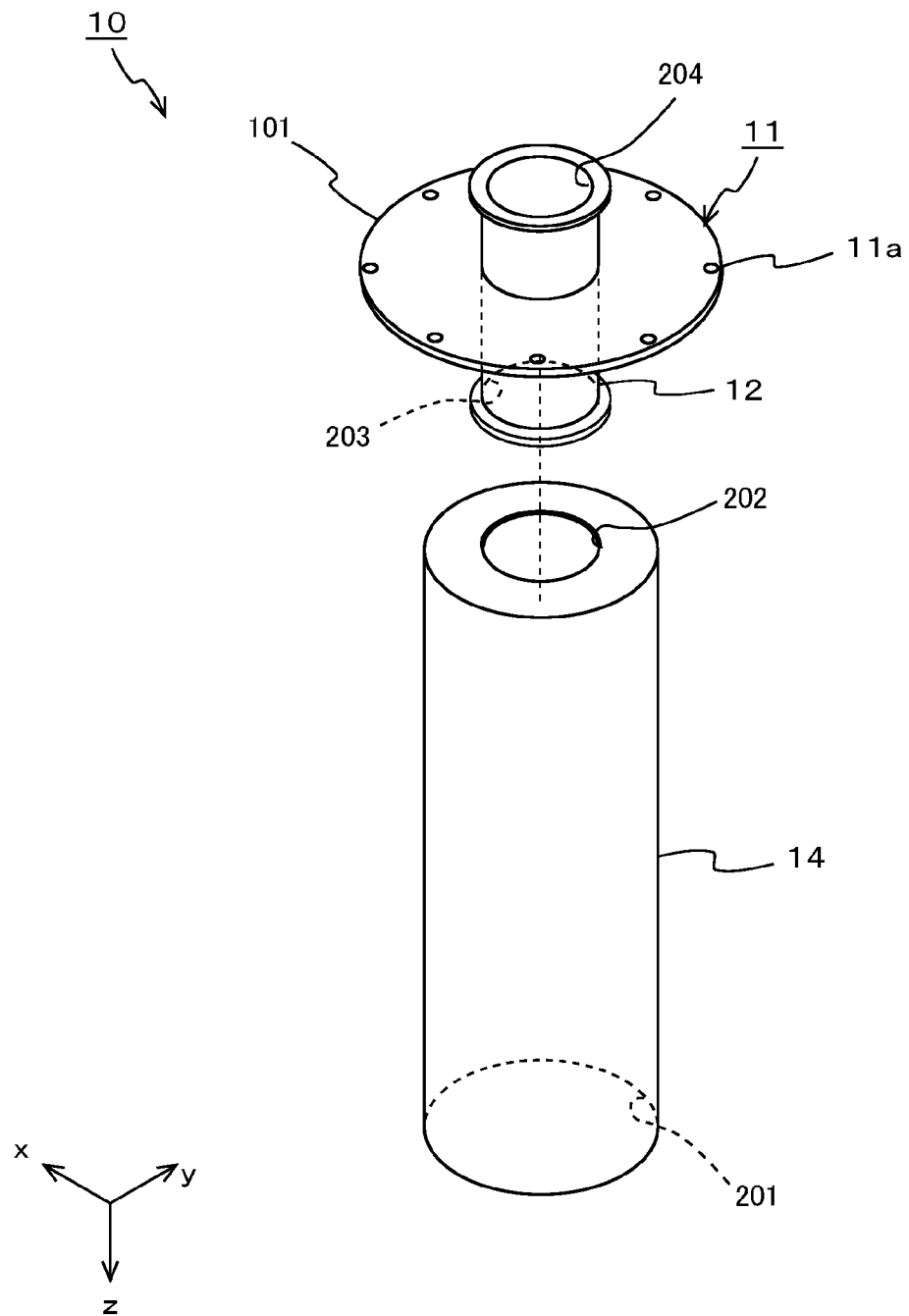
FIG. 5 is an exploded perspective view of the separation unit 10 for illustrating the assembly example (Part 2).
Figure 6:
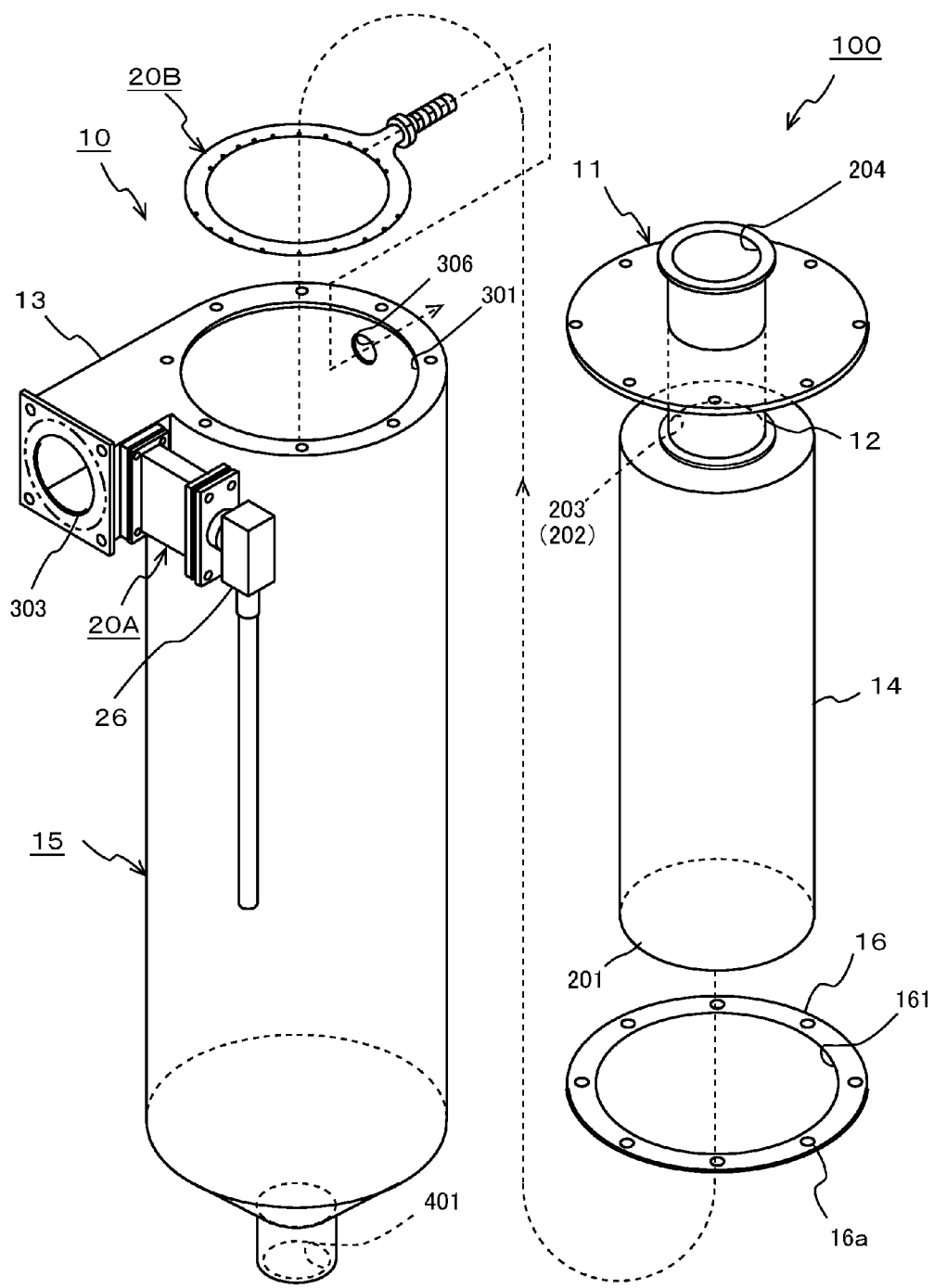
FIG. 6 is an exploded perspective view of the separation unit 10 for illustrating the assembly example (Part 3).

Referring to FIGS. 4 to 6, assembly examples (Parts 1 to 3) of the separation unit 10 will be described. In FIG. 4, first, the first water spray unit 20A is attached to the separator 15. Prior to this, the separator 15 including the introduction portion 13, the slit 305, and a hole 306 is prepared. The hole 306 is a portion to which the second water spray unit 20B is attached.

For example, the separator 15 is formed by connecting a strip plate cut and cylindrically bended and a portion that becomes the rectangular introduction portion 13 to a top plate which is cut into a 9-like shape. The slit 305 (opening) having the length L0×the width W is formed at a predetermined position of the introduction portion 13. The hole 306 may be formed at a predetermined position in the developed state before cylindrically forming the strip plate.

As a matter of course, the opening 301 is formed at the center of the top plate. To engage with the cover 11, the opening 301 is configured to have a flange shape at its opened face side, and it is prepared that for example, eight female screws for engagement with bolts are formed on the flange face.

Next, to produce the first water spray unit 20A, a frame member 21, a packing member 22, an I-like attachment member 23, a packing member 24, the nozzle 25 and a nozzle connection portion 26 are prepared. The frame member 21 including a long rectangular opening 221 having the substantial same size as the slit 305 is prepared. The frame member 21 may be made of the same material as the material for the cover 11 and the introduction portion 13. Screws 21a are screwed to four corners of the frame member 21. A rubber plate having a long rectangular opening 222 at the center thereof and openings 22a for passage of bolts at four corners thereof is prepared as the packing member 22.

A member having space (flat duct) that can induce a flat fan-like water film is prepared as the I-like attachment member 23. For example, one side of the flat duct is formed to be a flange portion that can be surface-connected to the frame member 21, and the other side of the flat duct is formed to be a flange portion that can be surface-connected to the nozzle connection portion 26.

The member in which the flange portion has an opening (not illustrated) with the same long rectangular shape as the opening 221 of the frame member 21, and four openings 23a for passage of bolts at four respective corners thereof is prepared. The member in which the other flange portion has a circular opening 231 with the substantially same diameter as the nozzle 25 and four openings 23b for passage of bolts at four respective corners thereof is prepared. A rubber plate having a circular opening 241 at the center thereof and openings 24a for passage of bolts at four corners thereof is prepared as the packing member 24.

A member including the nozzle 25, a water supply pipe 251 and a nozzle plate 252 is prepared as the nozzle connection portion 26. As a matter of course, the nozzle connection portion 26 may have any structure as long as it is configured to connect the nozzle 25 to the water supply pipe 251. The nozzle 25 is provided on the nozzle plate 252. A member on which four openings 25a for passage of bolts are formed at four respective corners thereof is prepared as the nozzle plate 252. A member having a tip that can spray water in a flat fan-like fashion is prepared as the nozzle 25.

When these members are prepared, the packing member 22 illustrated in FIG. 4 is sandwiched between the attachment member 23 and the frame member 21 and the attachment member 23 is attached to the frame member 21. At this time, the opening 221 is aligned with the opening 222. Then, the four corners of the flange portion of the attachment member 23 are fixed to the frame member 21 using four bolts, not illustrated.

Next, the nozzle connection portion 26 is attached to the attachment member 23. In this embodiment, the tip of the nozzle 25 is inserted into the opening 241 of the packing member 24. The packing member 24 is sandwiched between the attachment member 23 and the nozzle connection portion 26 and the nozzle connection portion 26 is attached to the attachment member 23. The nozzle connection portion 26 is fixed to four corners of the flange portion of the attachment member 23 using four bolts, not illustrated. The fixation enables the separator 15 with the water spray units to be obtained.

When the separator 15 with the water spray units is prepared, the cover 11 illustrated in FIG. 5 is assembled. A member in which the cylindrical portion 12 is connected to the body portion 101 is prepared as the cover 11. For example, a member which is produced by cutting a metal plate having a predetermined thickness into a disc shape, and forming eight engagement holes 11a in the periphery thereof and an opening (not illustrated) for connection to the cylindrical portion at the center thereof is prepared as the body portion 101.

The cylindrical portion 12 is produced by cutting a pipe material having a predetermined outer diameter to a predetermined length, and after the pipe material is inserted into the opening of the body portion 101 for connection to the cylindrical portion, upper and lower ends of the pipe material are processed into a flange shape. The pipe material is connected to the opening, not illustrated, of the body portion 101 at a predetermined inserted position. The other end of the cylindrical portion 12 forms an opening 203. This enables a spinning top-like cover to be obtained.

In this embodiment, the cylindrical portion 14 is connected to the underside of the cylindrical portion 12. For example, the cylindrical portion 14 is produced by cutting a pipe material having a larger outer diameter than the outer diameter of the cylindrical portion 12 to a predetermined length, and the opening 202 for connection to the cylindrical portion is formed in the pipe material. The upper portion of the pipe material is processed into a flange shape. For instance, an annular flat plate (collar plate) is connected to the top of the pipe material. This enables the cylindrical portion 14 having the upper flange portion to be obtained.

When these members are prepared, the spinning top-like cover is connected to the cylindrical portion 14. For instance, the opening 203 of the cylindrical portion 12 is aligned with the opening 202 of the cylindrical portion 14 and the flange portion of the cylindrical portion 12 is welded to the upper flange portion of the cylindrical portion 14. This enables the cover 11 connected to the cylindrical portion 14 to be obtained.

When these members are prepared, the cover 11 with the cylindrical portion illustrated in FIG. 6 is attached to the separator 15. Prior to this, the second water spray unit 20B is attached to the inside of the separator 15. For example, as the second water spray unit 20B, a member provided with a plurality of blow-off ports on the surface of the annular pipe is prepared. For example, the blow-off ports may be alternately opened to the outside and to the inside in the direction perpendicular to the pipe axis. The blow-off ports opened to the outside can radially spray water to the inner periphery (inner wall) of the separator 15. The blow-off ports opened to the inside can spray water to the outer peripheries (outer walls) of the cylindrical portions 12 and 14.

After the second water spray unit 20B is attached, the cover 11 is attached to the separator 15 with a packing member 16 illustrated in FIG. 6 interposed therebetween. An O-type rubber plate having a circular opening 161 at the center thereof is prepared as the packing member 16. For example, openings 16a for passage of bolts are provided in the periphery of the packing member 16 at intervals of 45 degrees.

At this time, the cylindrical portion 14 of the cover 11 is inserted into the opening 161 of the packing member 16 and then, the tip of the cylindrical portion 14 is inserted into the separator 15 as well as the second water spray unit 20B. Then, the cover 11 is placed over the flange portion of the separator 15 while the packing member 16 is sandwiched between the separator 15 and the cover 11. The cover 11 is attached to the separator 15 so as to close the separator 15. At this time, the peripheries are fixed using eight bolts, not illustrated. Thus, the separation unit 10 illustrated in FIG. 2 is complete.

Figure 7:
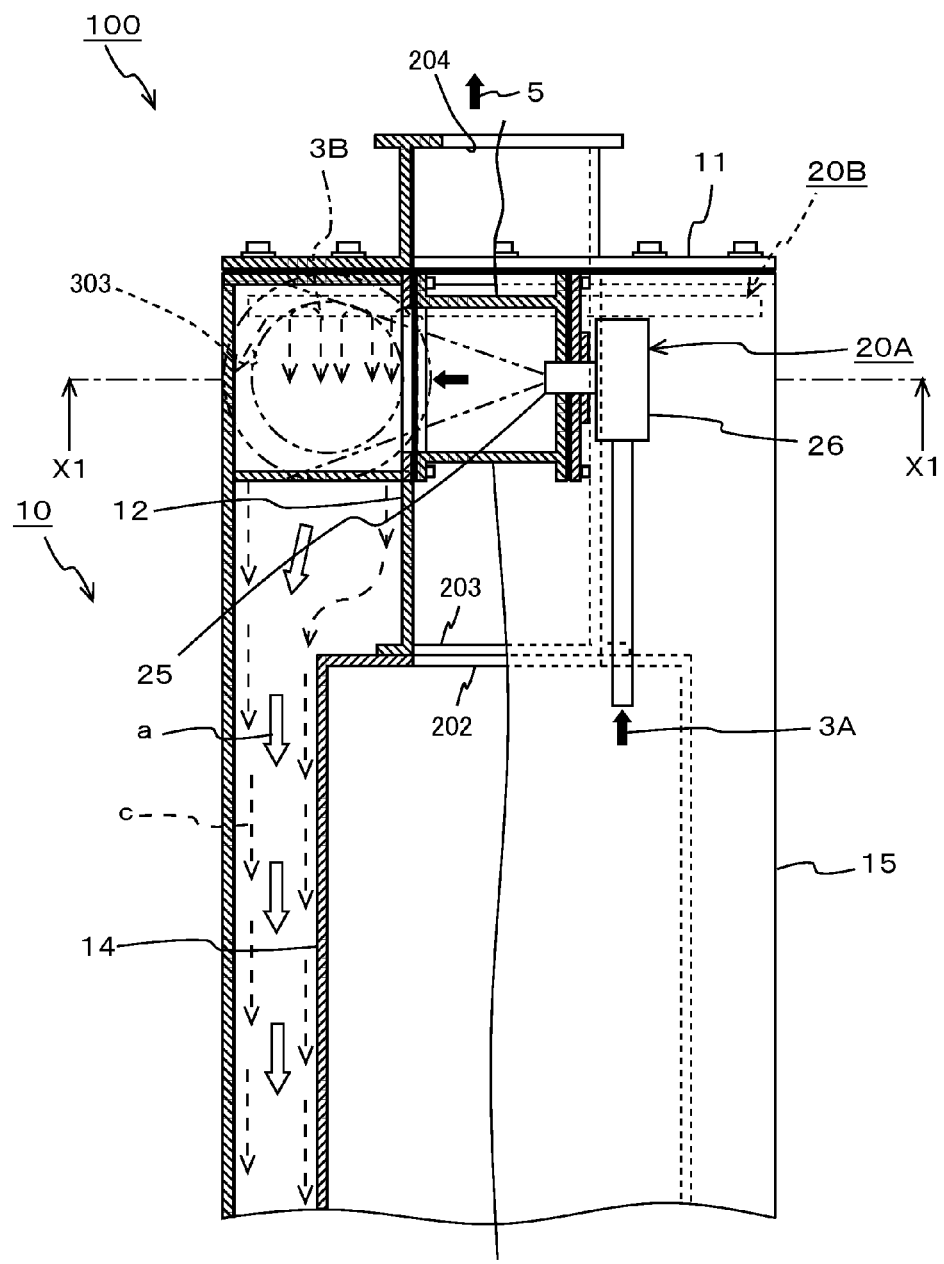
FIG. 7 is a partially-cutaway sectional view of the flux recovery device 100 for illustrating exemplary operation (Part 1) when viewed from side.
Figure 8:
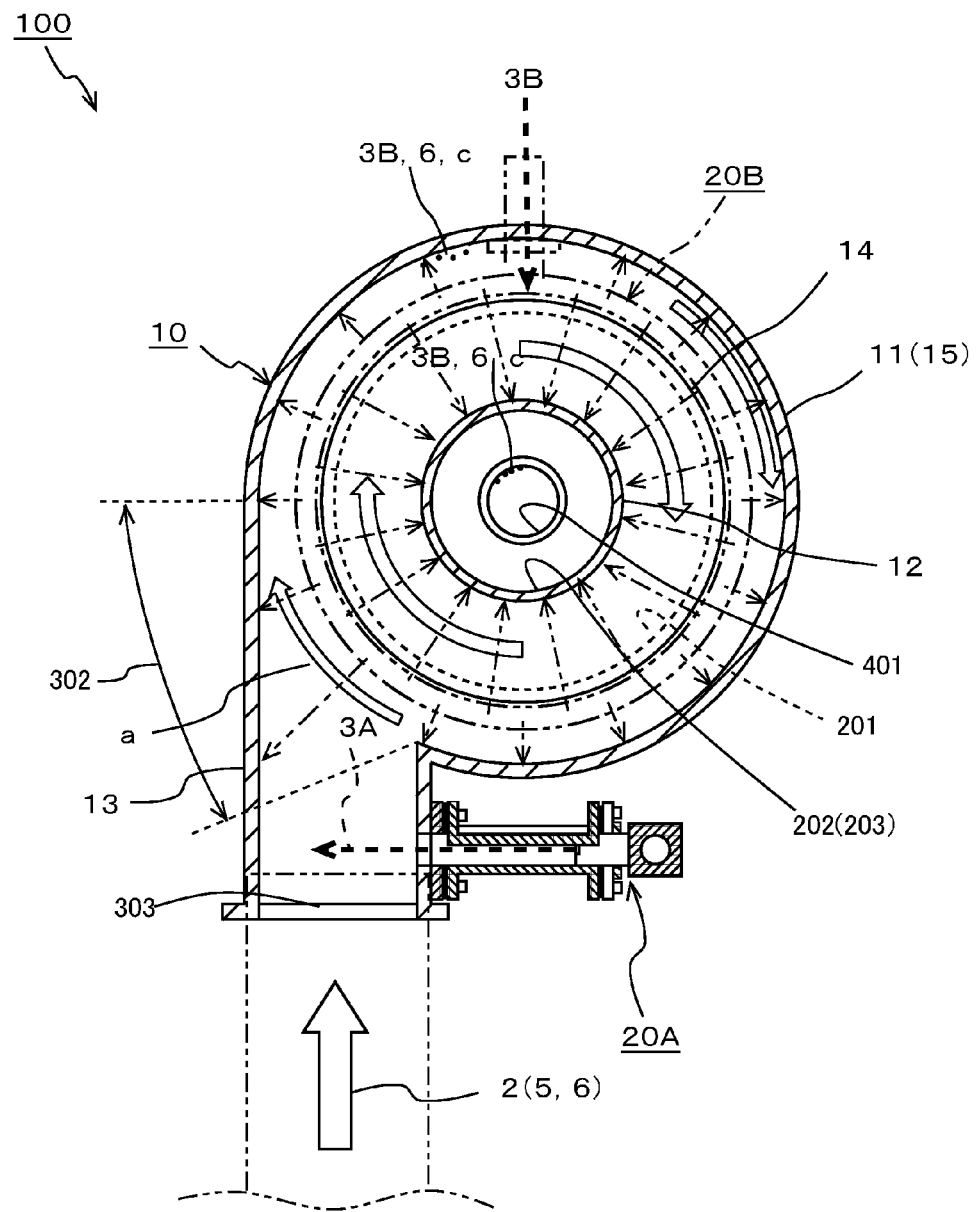
FIG. 8 is a sectional view of the flux recovery device 100 for illustrating the exemplary operation (Part 2) when viewed from above.

Referring to FIGS. 7 and 8, an operational example (Parts 1, 2) of the flux recovery device 100 will be described below. It is to be noted that FIG. 8 is a sectional view of the flux recovery device 100 taken along a line shown by arrows X1-X1 in FIG. 7. In this embodiment, the gaseous mixture 2 is taken through the introduction port 303 in the tangent direction of the separator 15.

In FIG. 7, when the first water spray unit 20A is viewed from the side, the conducted water 3A is sprayed from the nozzle 25 toward the introduction port 303 in a flat fan-like fashion (first precipitation flow). Preferably, the fan-like water film is larger than the diameter of the pipe connected to the introduction port 303. By making the water film larger than the diameter of the pipe, the gaseous mixture 2 can be caused to pass through the water film without any leakage. In this manner, it is possible to take a configuration such that the water film (water curtain) blocks the path over the introduction port 303.

The gaseous mixture 2 is moistened by the first water spray unit 20A illustrated in FIG. 7 and then, it enters into the separator 15 through the joint portion 302 illustrated in FIG. 8. Since the blower 30 circulates gas, the swirling flow "a" occurs in the separator 15. The swirling flow "a" rotates in a clockwise direction represented by an arrow outline with a blank inside (right hand rotation). At this time, the second water spray unit 20B radially sprays the conducted water 3B.

In this embodiment, the second water spray unit 20B forms a precipitation flow "c" on the inner wall of the separator 15 (See FIG. 7), and on the outer walls of the outer walls of the cylindrical portions 12 and 14 (second precipitation flow). The moist gaseous mixture 2, which is represented by an arrow outline with a blank inside in the drawing, advances toward the precipitation flow "c". The moist gaseous mixture 2 falls to a side of the drain port 401 while swirling.

The gaseous mixture 2 falls between the outer peripheries of the cylindrical portions 12 and 14 and the inner periphery of the separator 15 while swirling on the swirling flow "a" in the separator 15. During this swirling, the water 4 containing the flux 6 and the gas 5 are centrifuged, and the water 4 containing the flux 6, which is heavier than the gas 5, is guided to the drain port 401. As described above, since the gaseous mixture 2 receives the first precipitation flow and then, receives the second precipitation flow, the recovery property of the flux 6 can be improved, and the flux 6 can be prevented from adhering to the inner wall of the separator 15 and the outer walls of the cylindrical portions 12 and 14.

Further, from the gas 5, which is guided to the gas exhaust 204 (exhaust port) of the cylindrical portion 12 after the flux has been removed, water vapor component is removed (dehumidified) by the condensation unit 17. Dehumidified gas 7 is returned to the soldering unit 40 by a blowing force of the blower 30. The water 4 containing the flux 6 is discharged from the drain port 401 of the separator 15 to the outside (downward in the figure). The water 4 has been separated from the moist gaseous mixture 2. Thereby, it is possible to efficiently separate the flux 6 from the gaseous mixture 2, clean the gas 5 and recover the flux 6.

<Modification>

Figure 9:
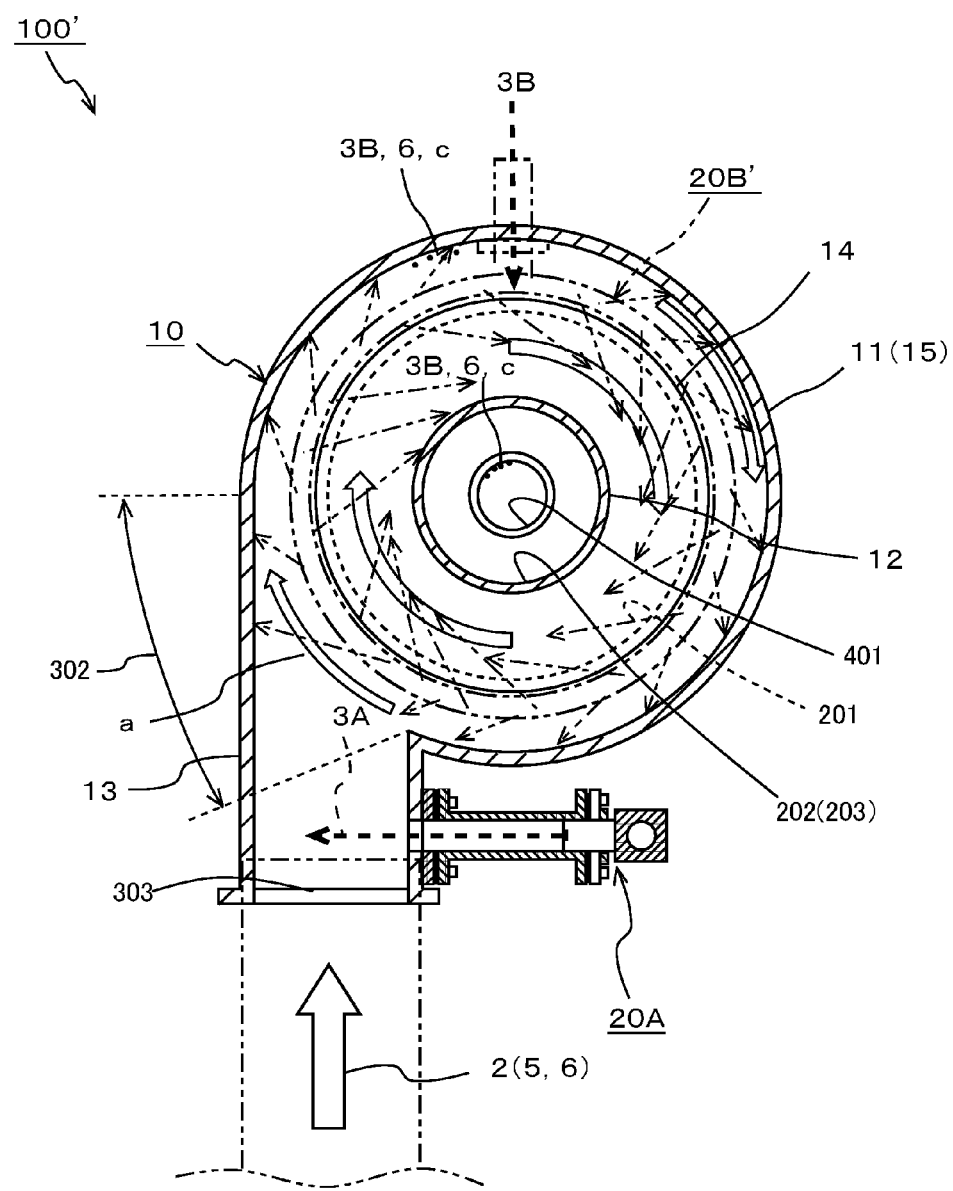
FIG. 9 is a sectional view of a flux recovery device 100' as a modification for illustrating a configuration example and an operation example when viewed from above.

Referring to FIG. 9, exemplary configuration and operations of a flux recovery device 100' that is a modification will be described below. The flux recovery device 100' includes a second water spray unit 20B' having a configuration that differs from that of the second water spray unit 20B of the flux recovery device 100. The second water spray unit 20B', like the second water spray unit 20B, includes a plurality of blow-off ports on the surface of annular pipe, but the blow-off ports opened to the outside are formed along the tangent direction of the pipe axis, rather than the direction perpendicular to the pipe axis.

The blow-off ports opened to the opposite side (inner side) are formed in the direction in line symmetry with respect to the pipe axis. These directions are directions which correspond to the swirling flow "a". The blow-off ports opened along the tangent direction of the pipe axis enable water to radially spray toward the inner periphery (inner wall) of the separator 15. The blow-off ports opened in the direction in line symmetry with respect to the pipe axis also enable water to radially spray toward the outer peripheries (outer walls) of the cylindrical portions 12 and 14. This forms the swirling precipitation flow "c" on the inner wall of the separator 15, and the swirling precipitation flow "c" on the outer walls of the cylindrical portions 12 and 14 (second precipitation flow). The moist gaseous mixture 2, which is represented by an arrow outline with a blank inside in the drawing, advances toward the swirling precipitation flow "c". This enables the moist gaseous mixture 2 to fall to the side of the drain port 401 while being promoted to swirl.

Figure 10:
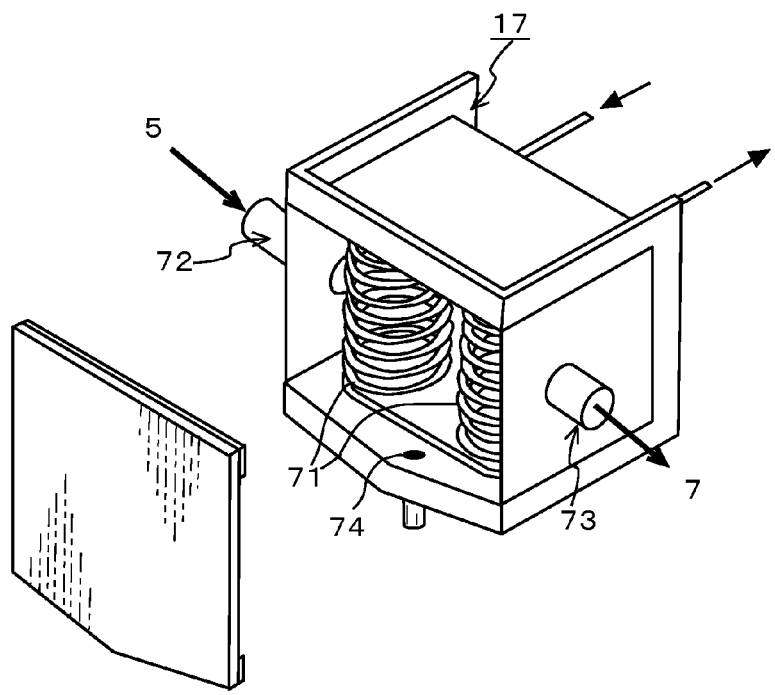
FIG. 10 is a perspective view of a water-cooled coil-type condensation unit.
Figure 11:
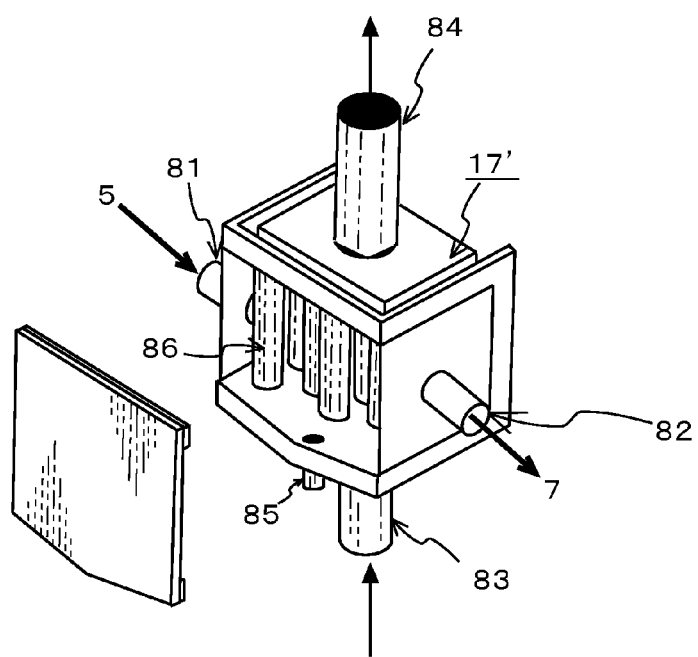
FIG. 11 is a perspective view of an air-cooled multitude condensation unit.

Referring to FIGS. 10 and 11, an example of the condensation unit will be described below. The condensation unit is not limited to the following example. First, referring to FIG. 10, an example of the condensation unit 17 that is a water-cooled coil-type condensation unit will be described. The condensation unit 17 has a box-shaped body (FIG. 10 illustrates the inside thereof). Pipes 72, 73, and 74 are connected thereto. A coil-shaped pipe 71 having a good heat conductivity is provided inside thereof. An inlet and an outlet of the pipe 71 are connected to an external water supply unit or the like such that water circulates from the inlet to the outlet. Describing a condensation process, first, liquid such as water flows into the pipe 71 to cool the surface of the pipe. The gas 5 containing water vapor sent from the separator 15 enters from the pipe 72 into the condensation unit 17, and is cooled with the pipe 71 to be condensed. Water generated by condensation flows from the pipe 74 to the outside, and is recovered and reused. Gas 7 with water removed is discharged from the pipe 73, and is sent to the blower 30.

Further, referring to FIG. 11, a condensation unit 17' as a modification of the condensation unit will be described. The condensation unit 17' is an air-cooled multi-tube condensation unit. The condensation unit 17' has a box-shaped body (FIG. 11 illustrates the inside thereof), and includes pipes 81 to 85 connected to the outside and a pipe group 86 having one or more pipes therein. Although details are omitted, the pipe 83, each pipe in the pipe group 86, and the pipe 84 communicate with each other, and an inlet of the pipe 83 is connected to a cool air blower or the like (not illustrated).

Describing a condensation process, first, cool air flows in the pipe 83, cools the outer periphery of the pipe group 86, and then, is discharged from the pipe 84. The gas 5 containing water vapor sucked from the separator 15 enters from the pipe 81 into the condensation unit 17', and is cooled with the outer periphery of the pipe group 86. Water generated by condensation flows from the pipe 85 to the outside, and is recovered and reused. The gas 7 with water removed is discharged from the pipe 82, and is sent to the blower 30.

Figure 12:
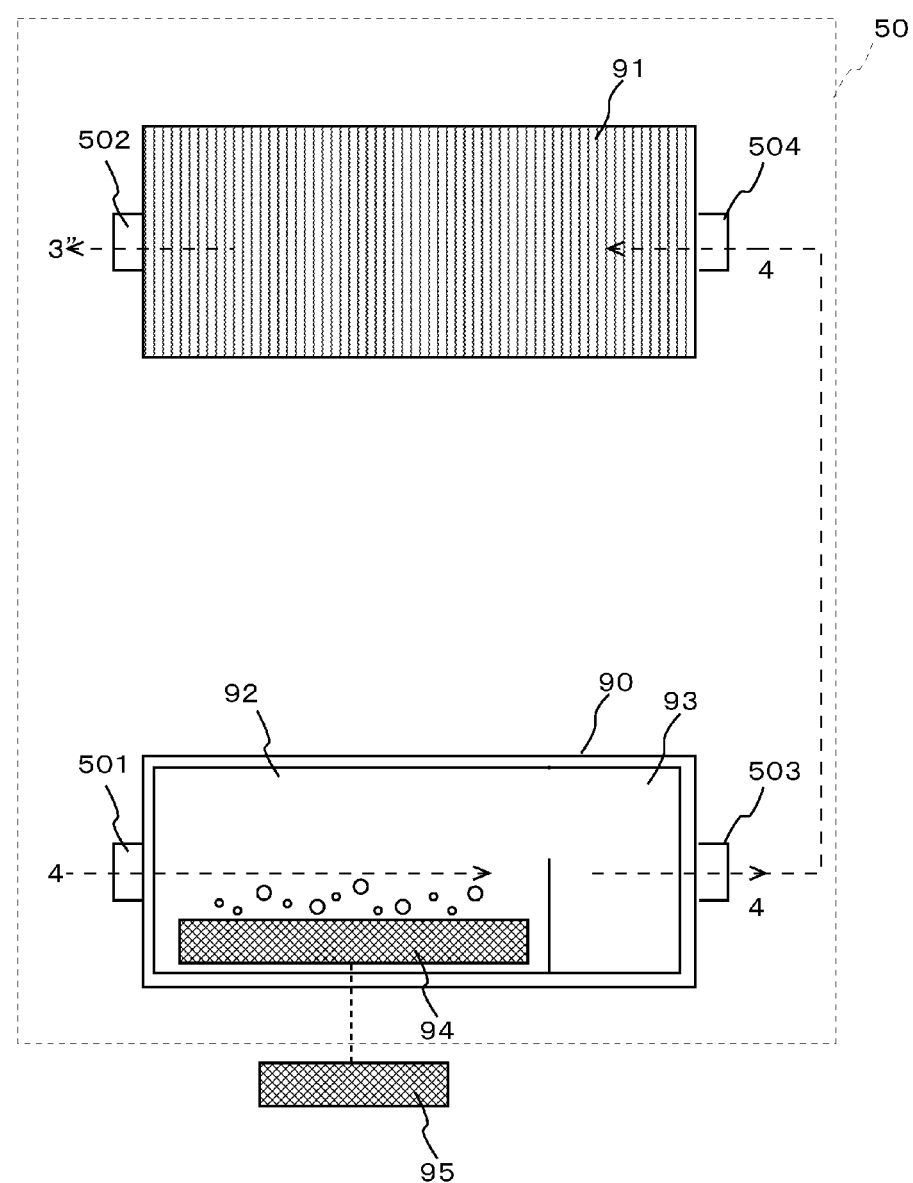
FIG. 12 is a system flow chart of a water cleaner 50.

Referring to FIGS. 1 and 12, a configuration example of the water cleaner 50 will be described below. The water cleaner 50 includes, for example, a combination of an ozonation unit 90 and an activated-carbon absorption unit 91 (activated carbon filter). The ozonation unit 90 includes an ozonation tank 92, a residence tank 93, and a blowing pipe 94. The water 4 containing the flux 6 enters into the ozonation unit 90 through an inlet 501, travels to the residence tank 93 through the ozonation tank 92, and is discharged from a drain port 503 to an inlet 504 of the activated-carbon absorption unit 91.

The blowing pipe 94 is connected to an external ozone generator 95, and foams ozone generated in the ozone generator 95 to supply the foam into the ozonation tank. When the water 4 passes through ozone atmosphere in the ozonation tank 92, an organic matter (the flux 6) in the water 4 is discomposed by an oxidizing power of ozone. The residence tank 93 accumulates the water 4, and promotes decomposition reaction of ozone. Next, the decomposed matter passes through a filter of the activated-carbon absorption unit 91, and is absorbed by activated carbon, thereby enabling water purification. The filter may include a plurality of types of meshes, and the meshes may be used alone or in combination.

Water 3" flowing out of a drain port 502 of the activated-carbon absorption unit 91 is sent to a water supply unit 51. The water supply unit 51 mixes the water 3" and clean water 3' supplied from the outside, and supplies the mixture to a chiller 52 serving as a water cooling means. The chiller 52 water-cools the water 3 sent from the water supply unit 51, and divides the water into the conducted water 3A to be sent to the water spray unit 20A and the conducted water 3B to be sent to the water spray unit 20B. According to the present invention, due to reuse of water, the water is gradually warmed with circulation. To prevent this, the chiller is used as a cooling means. In this example, the chiller 52 is disposed in series with the water supply unit 51 as illustrated in FIG. 1. Arrangement is not limited to this, and for example, the chiller 52 may be disposed in parallel with the water supply unit 51, and water in the water supply unit 51 may be cooled with the chiller 52 and then, returned to the water supply unit 51. Additionally, the clean water 3' sent from the outside is used for supplementing (supplying) a shortage in water circulation as necessary.

Thus, according to the flux recovery device 100, it is possible to recover water vapor generated in the device by the condensation unit, and reuse the water vapor. Moreover, since the gaseous mixture 2 containing the flux component receives the first precipitation flow, and then the second precipitation flow, the flux 6 can be efficiently separated in the separator 15.

Further, by the soldering unit 1, since it is equipped with the flux recovery device 100 or the flux recovery device 100' according to the present invention, it is possible to provide a hot-air reflow furnace and a jet soldering device that have a high-performance condensation type flux recovery function capable of recovering the flux 6 by utilizing the swirling flow "a" and the precipitation flow "c".

The present invention can also be applied to a flux recovery device in a flux application device. The flux application device, not illustrated, includes a flux application unit and the flux recovery device according to the present invention, and recovers a flux component from a gaseous mixture containing the flux component generated in the flux application unit. The flux application device has the same problems as described above; for example, an excessive floating flux that is not applied to the circuit board is adhered to the application device and accumulated thereon, and then, falls onto the circuit board, soiling the circuit board. Therefore, by utilizing the present invention, the excessive flux can be separated from the gaseous mixture containing the excessive flux, and clean gas can be circulated in the application device.

Therefore, the flux recovery devices 100 and 100' of the present invention can be used in the reflow furnace and the like to separate clean gas from the gaseous mixture 2 containing the flux component generated due to heating in the soldering unit 40. Further, they can be used in the flux application device and the like to separate clean gas from the gaseous mixture containing excessive flux generated in the flux application unit as the soldering unit.

INDUSTRIAL APPLICABILITY

The present invention is preferably applied to reflow furnaces, molten soldering devices, flux application devices and the like, which have the flux recovery function of recovering a flux component from a gaseous mixture containing the flux component generated in reflow processing, molten soldering processing, and flux application processing, by using a swirling flow and a precipitation flow, as well as removing water vapor.

DESCRIPTION OF CODES

1 Soldering device
10 Separation unit
11 Cover
12, 14 Cylindrical portion
13 Introduction portion
15 Separator
16 Packing member
17 Condensation unit
20A First water spray unit
20B Second water spray unit 30 Blower
40 Soldering unit
50 Water cleaner
100, 100' Flux recovery device

The invention claimed is:

1. A flux recovery device that recovers a flux component from a gaseous mixture containing the flux component, the flux recovery device comprising:
    a first water spray unit that sprays water into the gaseous mixture;
    a separation unit that includes an introduction port for introducing the gaseous mixture, the separation unit using a swirling flow to separate the flux component from the gaseous mixture;
    a second water spray unit that forms a precipitation flow inside of the separation unit; and
    a condensation unit that removes water vapor generated in the separation unit.

2. The flux recovery device according to claim 1, wherein the separation unit comprises:
    a cylindrical body for separation of the flux component, the cylindrical body including an introduction portion in an upper side portion thereof, an opening in an upper portion thereof, and a conical portion in a lower portion thereof; and
    a cover engaged with the opening of the cylindrical body, wherein
    the cover includes a disc-shaped body portion,
    an exhaust cylindrical portion having a predetermined length passes through the body portion,
    the conical portion includes a drain port,
    when the gaseous mixture is taken into the introduction portion from a tangent direction of the cylindrical body, the flux component and water confluent with the precipitation flow formed on an inner side of the cylindrical body by the second water spray unit by means of the swirling flow formed by the first water spray unit are discharged from the drain port, and
    the cylindrical portion takes gas separated from the gaseous mixture at one end and exhausts the gas from the other end.

3. The flux recovery device according to claim 1, wherein
    the first water spray unit has a nozzle configured to spray the water in a conical or circular sector shape, and
    the second water spray unit includes an annular pipe having a plurality of blow-off ports, the annular pipe being configured to radially spray the water.

4. The flux recovery device according to claim 1, further comprising a water cleaner configured to clean water discharged from the separation unit.

5. The flux recovery device according to claim 4, wherein the water cleaner comprises an ozonation unit and an activated carbon filter.

6. The flux recovery device according to claim 1, further comprising:
    a water supply unit that supplies water to the first water spray unit and the second water spray unit; and
    a cooling unit that cools water of the water supply unit.

7. The flux recovery device according to claim 4, wherein the condensation unit is connected to the water cleaner, and water recovered by the condensation unit is supplied to the water cleaner.

8. A soldering device comprising:
    a soldering unit; and
    the flux recovery device according to claim 1, the flux recovery device being configured to recover the flux component from the gaseous mixture containing the flux component generated in the soldering unit.

9. The flux recovery device according to claim 2, wherein
    the first water spray unit has a nozzle configured to spray the water in a conical or circular sector shape, and
    the second water spray unit includes an annular pipe having a plurality of blow-off ports, the annular pipe being configured to radially spray the water.

10. The flux recovery device according to claim 2, further comprising a water cleaner configured to clean water discharged from the separation unit.

11. The flux recovery device according to claim 3, further comprising a water cleaner configured to clean water discharged from the separation unit.

12. The flux recovery device according to claim 2, further comprising:
    a water supply unit that supplies water to the first water spray unit and the second water spray unit; and
    a cooling unit that cools water of the water supply unit.

13. The flux recovery device according to claim 3, further comprising:
    a water supply unit that supplies water to the first water spray unit and the second water spray unit; and
    a cooling unit that cools water of the water supply unit.

14. The flux recovery device according to claim 4, further comprising:
    a water supply unit that supplies water to the first water spray unit and the second water spray unit; and
    a cooling unit that cools water of the water supply unit.

15. The flux recovery device according to claim 5, further comprising:
    a water supply unit that supplies water to the first water spray unit and the second water spray unit; and
    a cooling unit that cools water of the water supply unit.

16. The flux recovery device according to claim 5, wherein
    the condensation unit is connected to the water cleaner, and water recovered by the condensation unit is supplied to the water cleaner.

17. The flux recovery device according to claim 6, wherein
    the condensation unit is connected to the water cleaner, and water recovered by the condensation unit is supplied to the water cleaner.

* * * * *